United States Patent [19]

Hecker et al.

[11] Patent Number: 5,018,803
[45] Date of Patent: May 28, 1991

[54] THREE-DIMENSIONAL VOLUMETRIC SENSOR

[75] Inventors: Joel Hecker, Port Jefferson Station; Howard Stern, Greenlawn, both of N.Y.; Tom Heydenburg, Upper Saddle River, N.J.

[73] Assignee: Robotic Vision Systems, Inc., Hauppauge, N.Y.

[21] Appl. No.: 274,860

[22] Filed: Nov. 22, 1988

Related U.S. Application Data

[62] Division of Ser. No. 697,796, Feb. 4, 1985, Pat. No. 4,830,443.

[51] Int. Cl.$^5$ .................. G02B 26/10; G02B 5/04; G01B 11/24
[52] U.S. Cl. .................. 350/3.71; 356/376; 350/6.4; 350/286
[58] Field of Search .................. 350/3.71, 6.3, 6.4, 350/162.16, 286; 356/376, 379, 380

[56] References Cited

U.S. PATENT DOCUMENTS

| | | | |
|---|---|---|---|
| 4,487,472 | 12/1984 | Asano | 350/3.71 |
| 4,494,874 | 1/1985 | DiMatteo et al. | 356/376 |
| 4,573,758 | 3/1986 | Hecker et al. | 350/3.71 |
| 4,593,967 | 6/1986 | Haugen | 350/3.71 |
| 4,758,093 | 7/1988 | Stern et al. | 350/3.71 |
| 4,830,443 | 5/1989 | Hecker et al. | 350/3.71 |

Primary Examiner—Bruce Y. Arnold
Assistant Examiner—David R. Parsons
Attorney, Agent, or Firm—Max Fogiel

[57] ABSTRACT

A three-dimensional optical measurement system, where it is desired to move the light beam or plane to more than one position to increase the amount of data acquired. A rotating disk is provided with segments of lenses, zone plates or other rotationally invariant grating patterns on it. The beam or plane is passed through the segments as the disk rotates and is deflected to predetermined angles. The accurate repeatablility of this arrangement allows the use of calibration data and encoding of the light planes for ambiguity resolution to provide an accurate measurement system. Diverging beam light sources are readily accommodated. Similarly translating frames with segments of translationally invariant lenses or grating patterns may be used. Two-dimensional holographic gratings may be used to generate raster scans.

6 Claims, 10 Drawing Sheets

THREE-DIMENSIONAL VOLUMETRIC SENSOR

This is a division of application Ser. No. 697,796, now U.S. Pat. No. 4,830,443, filed Feb. 4, 1985.

BACKGROUND OF THE INVENTION

Optical triangulation is a convenient method of non-contact measurement. The prior art contains methods for projecting a pencil beam or a fan beam of light and viewing the image that the light beam creates on a surface to be measured. As long as the viewing device is in a known relationship to the projected light beam, then the three-dimensional co-ordinates of surface points illuminated by the projected light can be computed It is often desirable to gather more data than is available from the point image of a pencil beam of light or from the line image of a fan beam of light. The prior art contains methods for mechanically and/or electrically scanning the light beams so that data can be acquired from an area of a surface.

The present invention provides an improved method for mechanically scanning the light beams.

SUMMARY OF THE INVENTION

It is an object of the present invention to overcome the prior art disadvantages. In particular, it is the object of the present invention to provide a mechanical device for scanning the projected light beam in a 3-D sensor to achieve accurate area and volumetric coverage.

In keeping with this object, and with still others which will become apparent as the description proceeds, the important characteristics of the invention are: greater accuracy and lower cost.

To achieve the objects of the present invention, the direction of a pencil beam of light is deviated by a rotating disk containing segments of several lenses, zone plates or other rotationally invariant grating patterns through which the beam is directed The beam is then spread by a lens into a fan beam to provide a sweeping plane of light. The sweeping light plane intersects a surface to be measured and the image of the intersection is recorded by a camera. The camera image is then covered by computation using calibration information to report three-dimensional co-ordinate data on each of the measured surface points. Segmented lenses and zone plates can also accommodate a divergent light source.

A second embodiment replaces the rotating disk with a sliding frame containing segments of several translationally invariant lenses or grating patterns through which the beam is directed.

A third embodiment employs two deflectors, either rotating segmented lenses, zone plates or other rotationally invariant grating pattern deflectors, or translationally invariant segmented lenses or grating pattern deflectors to provide a sweeping light plane rather than one deflector followed by a beam spreading lens.

A fourth embodiment employs a deflecting mechanism with segmented holographic gratings, either rotational or translational, that produce two-dimensional scanning of a light beam.

Another embodiment involves modulation of the light intensity during the scan, and integrating the resulting images during the camera recording in order to reduce the number of separate recordings.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

BRIEF DESCRIPTION OF THE DRAWINGS

FIG. 7b is a side view of another embodiment of the arrangement of FIG. 7a;

BRIEF DESCRIPTION OF PREFERRED EMBODIMENTS

Figure 1:
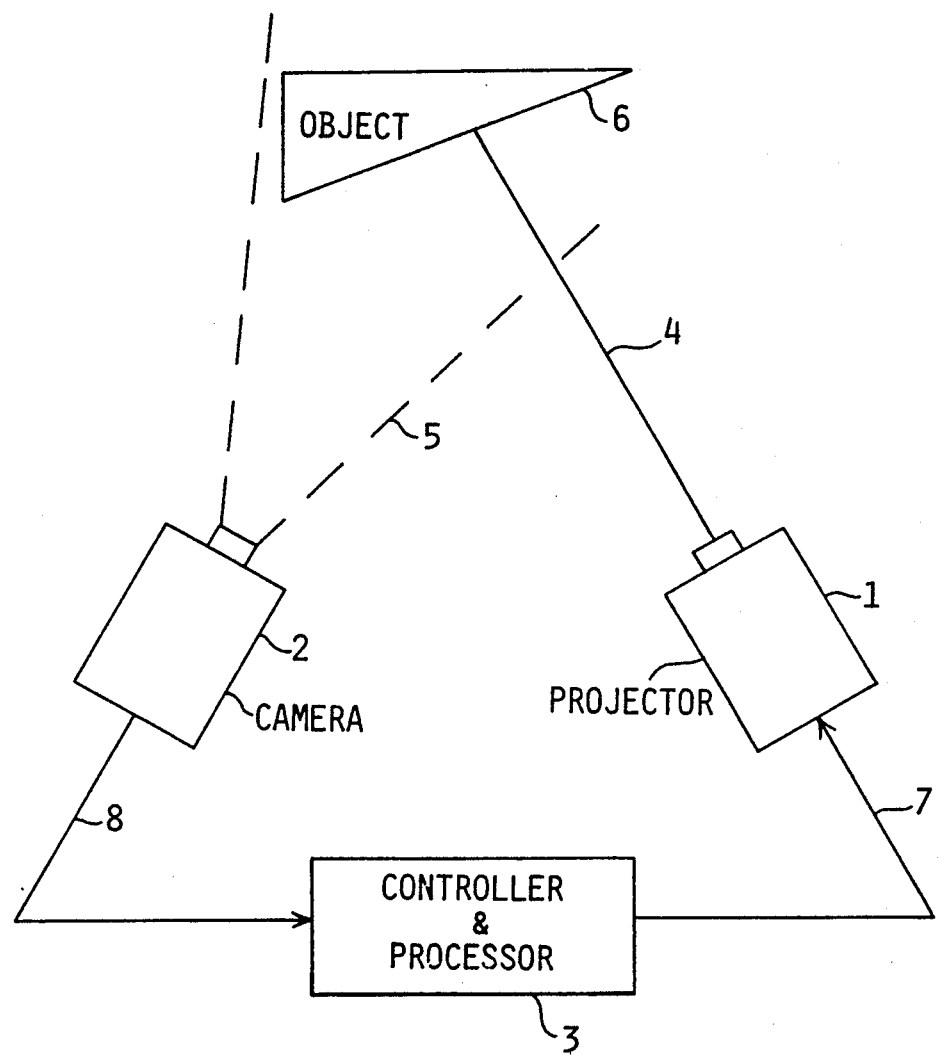
FIG. 1 shows schematically a vision system capable of measuring 3-D data on a surface.
Figure 2A:
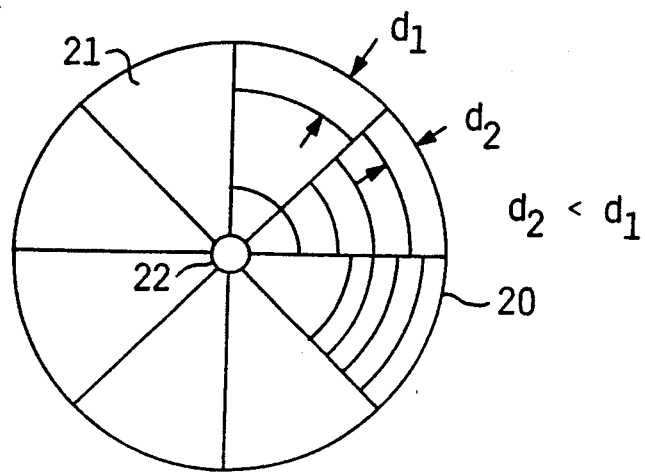
FIG. 2a is a schematic view of a constant radial grating period deflector.
Figure 2B:
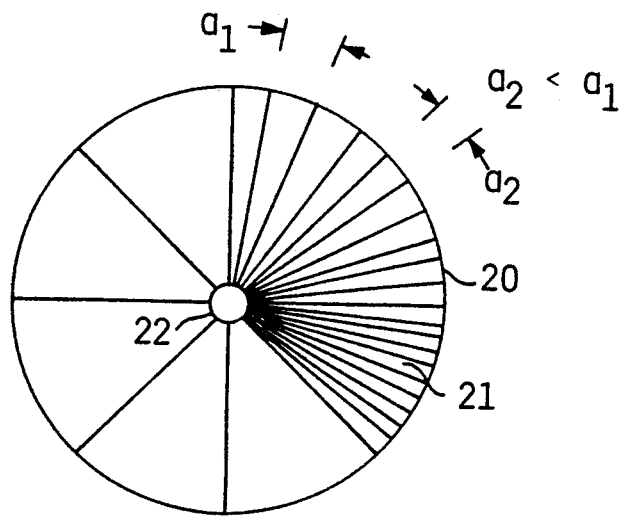
FIG. 2b is a schematic view of a constant angular grating period deflector.
Figure 2C:
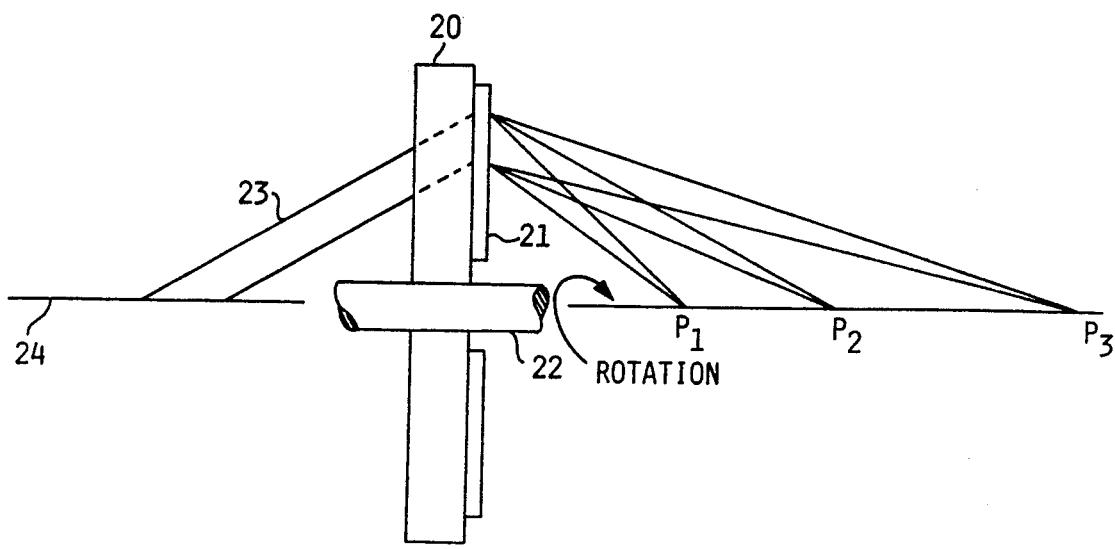
FIG. 2c is a sectional view of a segmented lens or zone plate deflector with narrow beam input.
Figure 2D:
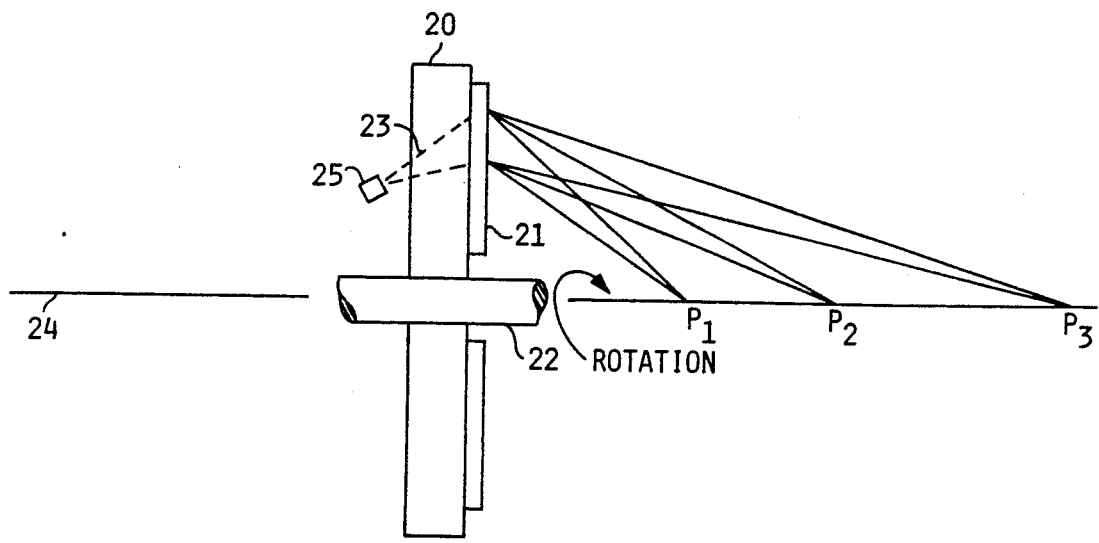
FIG. 2d is a sectional view of a segmented lens or zone plate deflector with dividing beam input.

FIG. 1 illustrates the components needed to form an optical measurement system using triangulation. Projector 1 projects a narrow pencil beam of light 4 which intersects the surface of object 6 which is to be measured. Camera 2 views the image of the intersection of the beam of light 4 with the surface of object 6. The angle that the view of camera 2 makes with light beam 4 must be known in order to compute the measured coordinate of the point at the light beam/surface image. The value of the angle can be obtained by calibration. Field of View 5 of camera 2 encompasses a length on light beam 4 that can report imaged points. The imaged point can be recorded on film for non-real time systems or recorded by a real time sensor such as a TV camera. In a real time system the image is immediately converted to a video signal 8 which can be converted to threedimensional co-ordinate data by the Controller/Processor 3 employing the triangular relationships of the system.

If light beam 4 is scanned in a direction preferably perpendicular to the plane of the system formed by the central axis of the projector 1 and lens node of camera 2, then several points on the surface of object 6 may be measured. If the scan is sufficiently rapid to go from the bottom to top (or vice versa) of Field of View 5 within the camera 5 integration time, then the loci of light beam/surface intersection points will be the same as that provided by a plane of light. Field of View 5 then encompasses an area of the apparent plane of light and numerous points can be reported in a short period of time. Controller/ Processor 3 can assure that the beam 4 sweep is synchronized to the integration time of camera 2 via timing control signal 7.

FIG. 2 illustrates the novel feature of this invention. As disclosed in the parent application, it is possible to deflect a light beam with very high repeatability if a rotating disk with segmented lenses, zone plates or grating patterns exhibiting rotational symmetry is used. FIG. 2a illustrates a segmented grating pattern deflector 20 with constant radial grating period in each segment 21. A different period is used in each segment 21 to give different amounts of deflection. FIG. 2b illustrates a segmented grating pattern deflector 20 with constant angular grating period in each segment 21. A different period is used in each segment 21. FIG. 2c shows a cross-sectional view of a segmented lens or zone plate deflector 20 in use with a different focal length for each segment. The deflector disk 20 rotates on its axis 24. A collimated beam of narrow spectral band light 23 is projected onto the disk 20 at a fixed angle. The lens or zone plate in each segment 21 deflects and focuses the light to a point such as $P_1$, $P_2$ or $P_3$ depending on the lens or zone plate focal length of the segment. Thus, as the disc 20 rotates, input light beam 23 is focused at $P_1$ when passing through one segment 21, at $P_2$ when passing through another segment 21, etc., for each segment 21 of disk 20. FIG. 2d shows a cross-sectional view of a segmented lens or zone plate deflector 20 similar to FIG. 2c except that a diverging light source 25, such as a laser diode, is used. The grating in each segment 21 deflects and focuses the diverging light beam 23 to a point such as $P_1$, $P_2$ or $P_3$ depending on the lens or zone plate focal length of the segment. Placing the light source 25 in close proximity to the lens or zone segment allows for high efficiency energy collection while reducing size and complexity of the light source.

A lens can accommodate a broader spectral band than a zone plate.

To suppress the higher order beams formed by squarewave diffraction gratings, sinusoidal gratings should be employed By using a segmented lens, zone plate or other grating pattern with rotational symmetry deflector 20, greater repeatability is obtained than with other means of mechanical beam deflection. Thus when a triangulation measurement is made it will more nearly equal the value at the time of calibration. In this manner the invention provides a means of producing more accurate measurements.

A single plane of light or an effective plane of light formed by a swept narrow light beam provides more measurement data than a stationary light beam. Likewise if the (effective) light plane is swept from one side of Field of View 5 to the other, an entire volume of the Field of View 5 that is in focus can report measured data. The light plane intersecting the surface of object 6 forms a line of measurable points. As the plane is swept across the object 6 surface orthogonal to the line of points, an area of points on the surface can be measured. The segmented lens, zone plate or other grating pattern deflector can provide this capability with high repeatability for high accuracy.

Figure 3A:
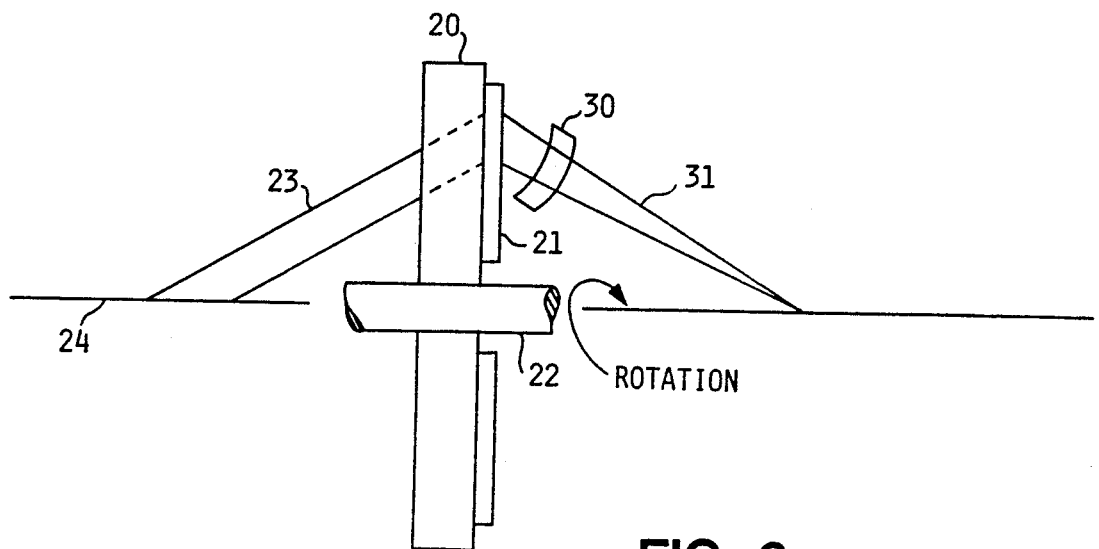
FIG. 3a is a sectional view of a segmented lens or zone plate deflector employing a toroidal lens.
Figure 3B:
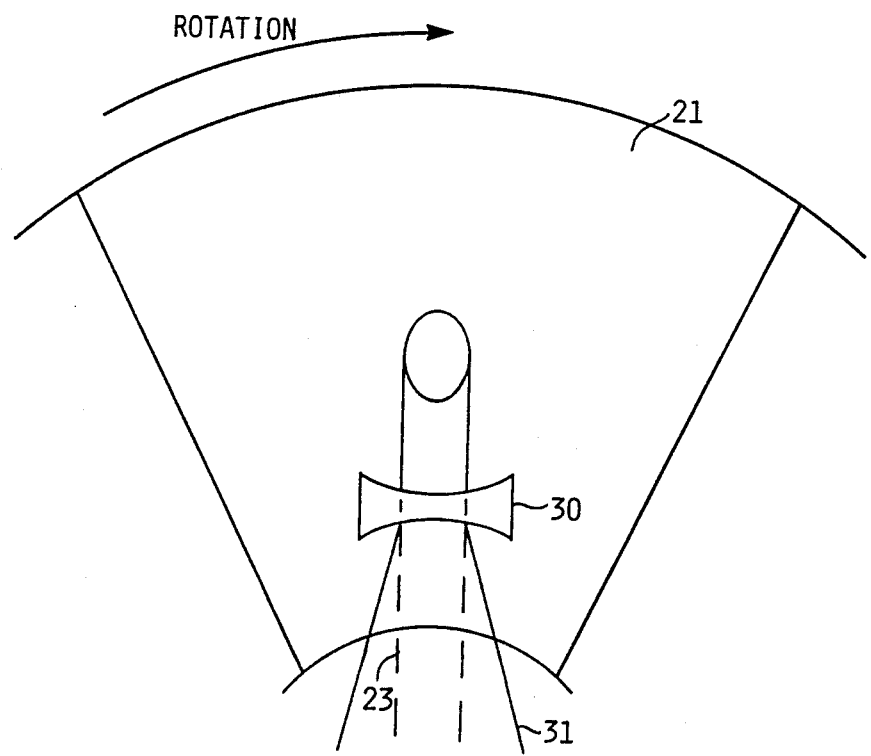
FIG. 3b is a front view of a segmented lens or zone plate deflector employing a toroidal lens.

One method is illustrated in FIGS. 3a and 3b shows a cross section of a lens or zone plate deflector 20 with input light beam 23 that is deflected and focused by a segment 21 containing a lens or zone plate. A toroidal lens 30 is placed in the deflected beam 31 to spread the beam into a plane as seen in the front view of FIG. 3b. As the disk 20 turns on its shaft 22 about axis 24, successive segments 21 with different focal lengths cause deflected light plane 31 to assume different angles, effectively providing a swept light plane.

Figure 4:
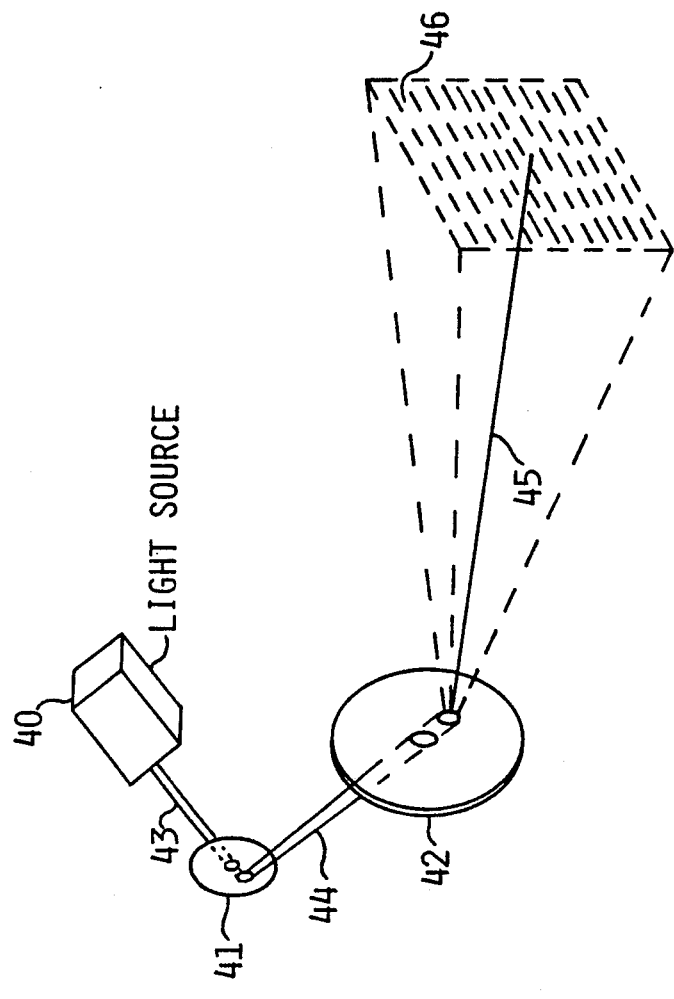
FIG. 4 shows schematically the scanning of a light beam in two dimensions.

A second method of forming an effective swept light plane is shown in FIG. 4. Here light source 40 projects a beam of light 43 that is deflected periodically in one direction by rotating segmented deflector 41 and then this effective light plane 44 is deflected by a second segmented rotating deflector 42. If deflector 41 rotates much faster than deflector 42, then output light beam 45 will scan a volume in raster form 46.

In both methods, improved repeatability can be obtained by using rotationally symmetric segmented lenses, zone plates or other rotationally invariant grating patterns as previously described. When a light plane is swept across an area of a surface to measure points on that surface, the points must be isolated in some way. One way is to flash the light plane, another is to shutter the camera. The intent of either method is to provide a time aperture small enough so that the sweeping light beam image in the camera is not broadened more than an acceptable amount by the motion of the beam across the surface. When using a segmented lens, zone plate or grating pattern deflector as described herein, the motion is in discrete steps which can serve to ease the difficulty of stopping the motion of the image or providing isolated data points.

If camera 2 integrates the image of a plane of light moving across the surface of object 6, a broad image is obtained and data points within the image area can only be known with certainty to be within the boundaries of the image area. If a segmented lens, zone plate or other grating pattern deflector causes the beam to sweep in steps greater than the width of the beam in the direction of the scan, then isolated image areas will be recorded and the data within each area can be computed to within the narrow confines of the beam width.

On smooth surfaces this is generally adequate to unambiguously determine the coordinates of all measured points on the surface. On more complicated surfaces, the light plane images break up and when several images are integrated by one camera recording, it becomes ambiguous as to which image was produced by a particular light plane position and the data points cannot be readily obtained. A method known in the prior art (see for instance U. S. Pat. No. 4,185,918) to resolve these ambiguities is to take several recordings with the light planes gated on or off in an encoded manner. By decoding the images the ambiguities can be resolved. For N plane positions, a recording at each position can be taken to unambiguously determine the coordinates of all points. However, by encoding the images in a binary manner only log (base 2) of N recordings are required. For N=8 only 3 recordings are required instead of 8 and the savings are even greater as N is increased. Controller and Processor 3 can generate the necessary pattern controls for projector 1 and decode the images reported via video signal 8.

Figure 5A:
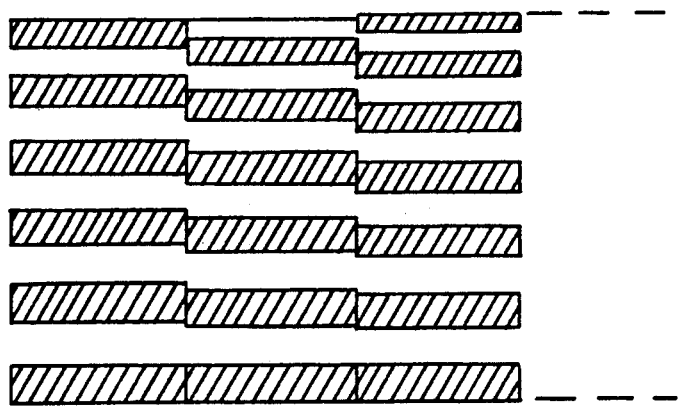
FIG. 5a is a schematic of deflectors containing translationally invariant segmented lenses and grating patterns, and shows in particular a graduated linear grating in each segment that is similar to a zone plate.
Figure 5B:
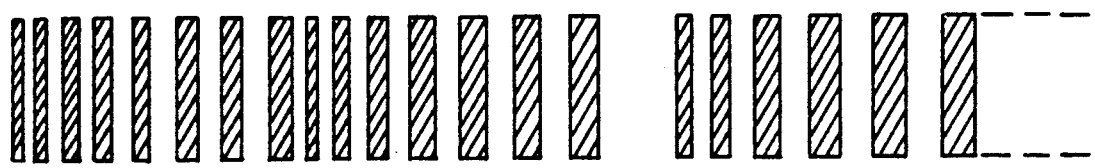
FIG. 5b shows that the same graduated patterns in FIG. 5a can be used perpendicular to the direction of translation.
Figure 5C:
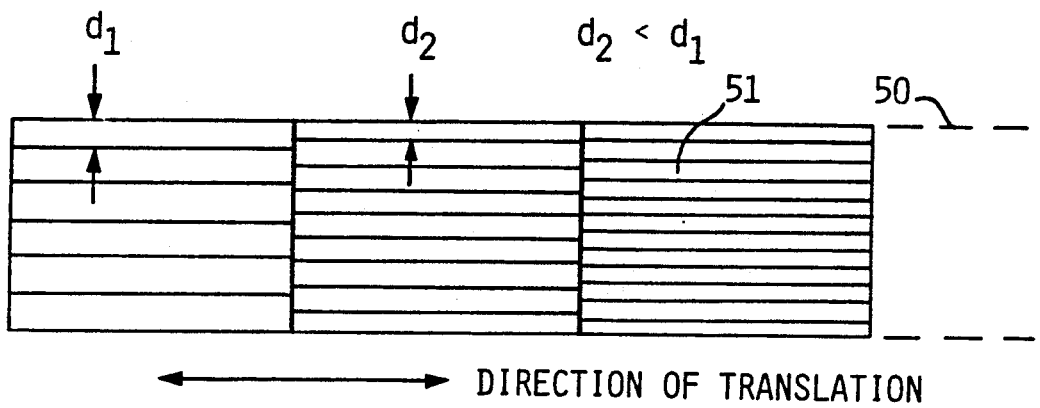
FIG. 5c shows a set of grating pattern segments, each having constant spacing to obtain a different deflection angle.
Figure 5D:
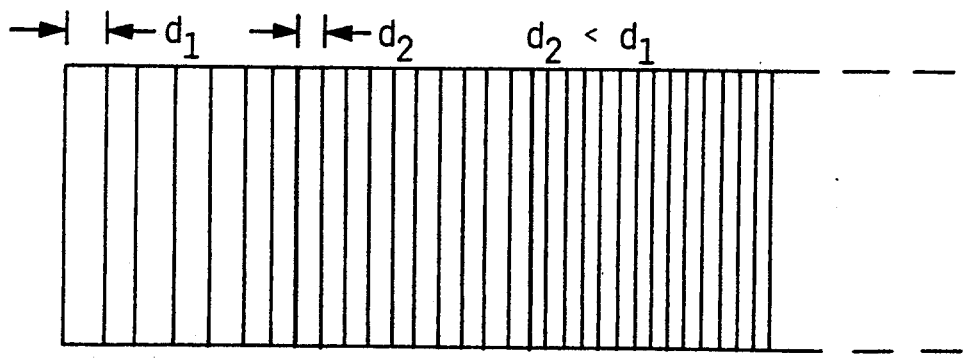
FIG. 5d shows a pattern orientation in which patterns can be continuously translated and the beam will only shift as it passes from one segment to the next.

In all of the above, rotational deflectors have been described. FIGS. 5a through 5d illustrate translational deflectors which can be used to perform in similar manner. They can be used interchangeably with the rotational deflectors. Instead of rotating about an axis to advance to the next segment, the deflector is translated. Segments of cylindrical lenses with different focal lengths can be used for broad or narrow band light sources and grating patterns can be used with narrow spectral band light sources. The grating patterns need to be linear in order to exhibit insensitivity to motion in the direction parallel to the grating lines. FIG. 5a illustrates a graduated linear grating in each segment, that is similar to a zone plate, which will focus the light beam in one direction and hence exhibit motion sensitivity perpendicular to the grating lines FIG. 5b illustrates that the same graduated patterns can be used perpendicular to the direction of translation (or any other angle). However, if the beam must remain stationary for a short period of time, the lens segment would have to be stationary for that period of time. FIG. 5c illustrates a set of grating pattern segments each having constant spacing in order to obtain a different deflection angle. Because of invariance of the pattern in two directions the deflected beam will not be sensitive to pattern translation motion within each segment. This is particularly significant for the pattern orientation shown in FIG. 5d. The patterns can be continuously translated and the beam will only shift as it passes from one segment to the next.

FIG. 6 illustrates three methods of producing twodimensional beam scanning with a single deflector. For treatment of the theoretical background see "Two-dimensional laser beam deflections using computer-generated holograms" pp. 54–58 SPIE vol. 126 (1977). Rotational disk 60 is employed as before to deflect a narrow spectral width light beam, however the focal point of each holographic grating segment 61 does not lie on the center of rotational axis 62, but rather, the hologram is designed to sweep the beam within a plane as the segment 62 rotates through the beam. Each segment deflects the beam at a different angle in a direction orthogonal to the planes formed by the swept beam within each segment. The planes are parallel, however, in the direction of the swept beam.

Figure 6A:
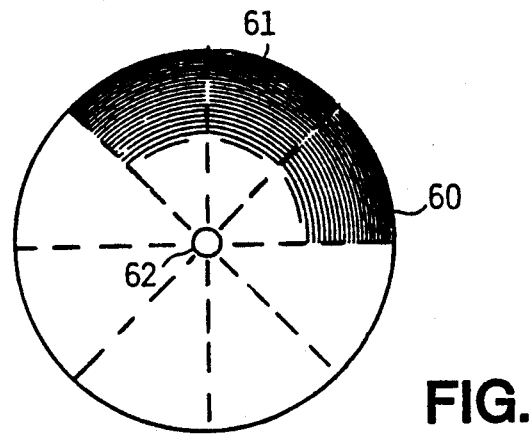
FIG. 6a shows one method of producing two-dimensional beam scanning with a single deflector.
Figure 6B:
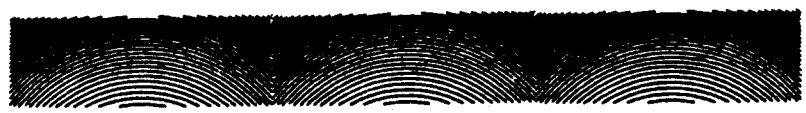
FIG. 6b shows another embodiment from that of FIG. 6a, in which a translatable frame with segments of holograms will deflect the beam at different angles within each segment and sweep the beam as the frame is translated.
Figure 6C:
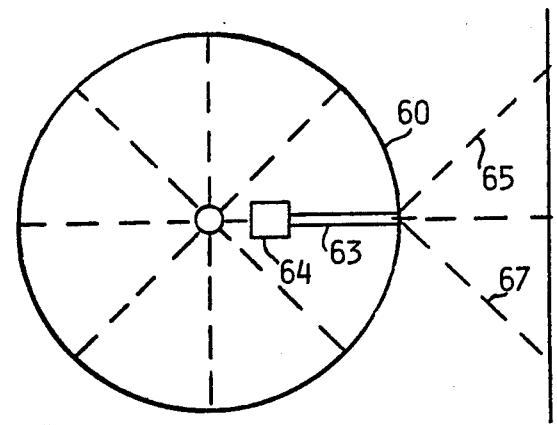
FIG. 6c shows an embodiment in which the hologram segments are wrapped around a wheel.
Figure 6D:
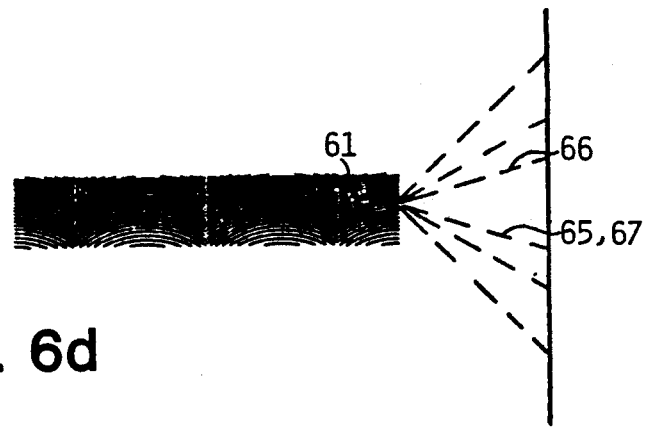
FIG. 6d shows a still further embodiment from that of FIG. 6c and shows schematically a segmented two-dimensional holographic rotational scanner, in which successive elements are designed to deflect the beam at greater downward angles.

FIG. 6b illustrates a translatable frame with segments of holograms that will likewise deflect the beam at different angles within each segment and sweep the beam as the frame is translated. By wrapping the hologram segments around a wheel 60 as shown in FIG. 6c, a convenient two-dimensional deflection system can be constructed. Light beam 63 from source 64 is deflected to path 65. As wheel 60 turns, the amount of deflection reduces to zero and then builds in the opposite direction until finally path 67 as one of the segments 61 traverse beam 63. Seen from the side, paths 65 through 67 reside in a plane shown in FIG. 6d as an edge view deflected downward. A second beam 66 will normally form which may be desired as providing two beams for two measurements simultaneously or suppressed by forcing the energy of the beam to primarily follow paths 65-67. Successive segments 61 are designed to deflect the beam at greater downward angles as shown in 6d. In each case a second beam is formed with similar, but opposite deflection.

The physical constraints on how many segments may be placed on a rotating or translating segmented deflector may be inadequate for a specific application. By cascading two deflectors and relating their motion such that varying combinations of deflections occur, the number of angular deflections produced can be greatly increased. The most obvious relationship would be to arrange for one deflector to produce sequentially all of its possible deflections for each deflection angle of the other deflector. For $N_1$ segments in the first deflector and $N_2$ segments in the second, as many as $N_1 \cdot N_2$ deflection angles may be produced. Of course cascading m deflectors may produce $N_1 \cdot N_2 - N_m$ angles. This allows a great many angles to be generated without being held back by the physical constraints of a single deflector.

The cascading is done similar to that shown in FIG. 4 for a raster scan. Instead of positioning deflector 42 to deflect the light beam orthogonal to the direction of deflection of deflector 41, deflector 42 would be positioned to deflect the light beam as an additional (positive or negative) deflection angle.

Figure 7A:
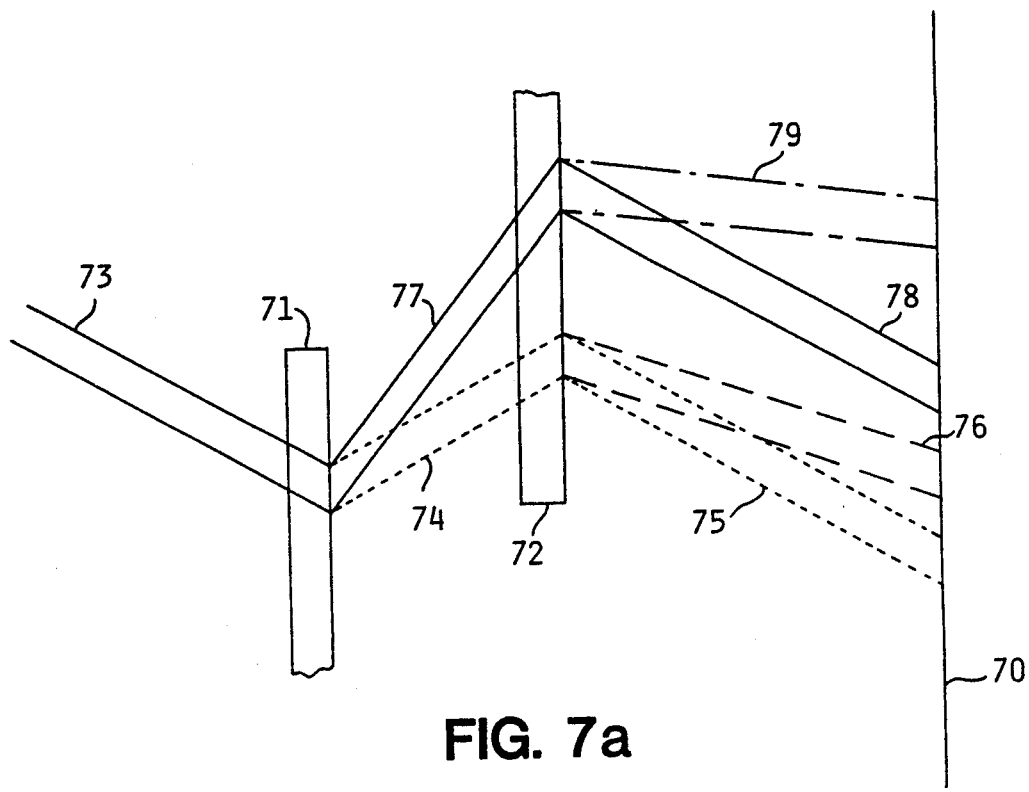
FIG. 7a is a side view and shows one embodiment for cascading deflectors to increase the number of angular deflections.
Figure 7B:
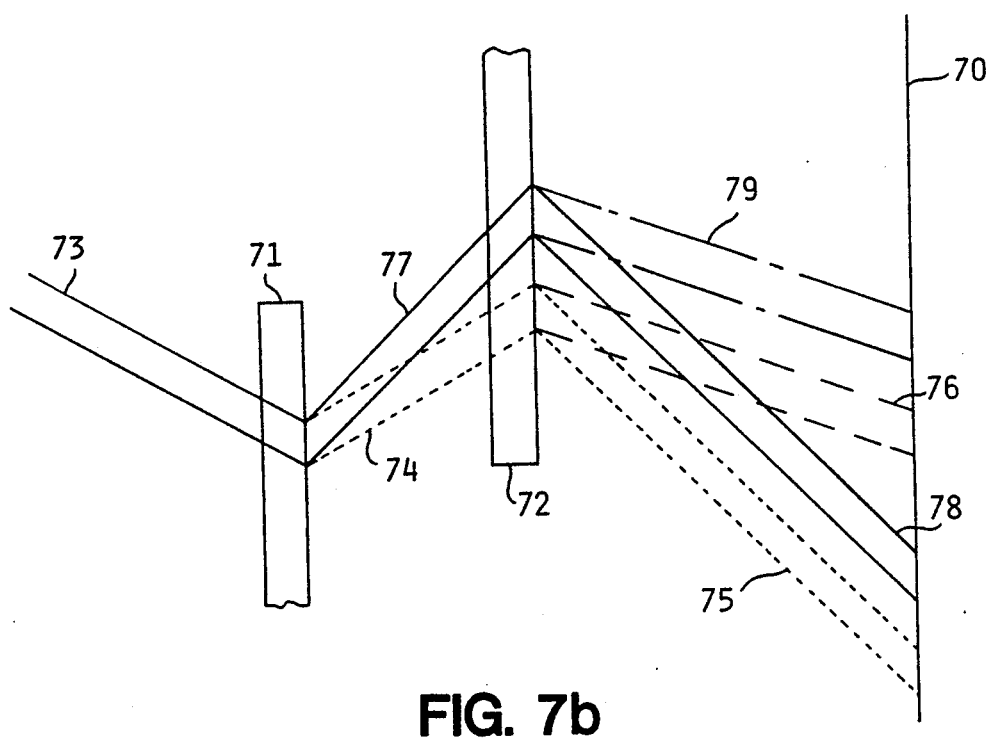

FIGS. 7a and 7b illustrate, in side view, two preferred methods of applying this principle. In FIG. 7a, first deflector 71 deflects input beam 73 by large increments shown typically as stepping from 74 to 77 and second deflector 72, in one position, deflects 74 to 75 and 77 to 78, while in a second position, second deflector 72 deflects 74 by a small change to 76 and similarly 77 to 79. The reverse assignment is equally effective as shown in FIG. 7b where first deflector 71 deflects input beam 73 by small steps such as 74 to 77 and second deflector 72 deflects the beam by large steps such as 75 to 76 for input 74.

Figure 8:
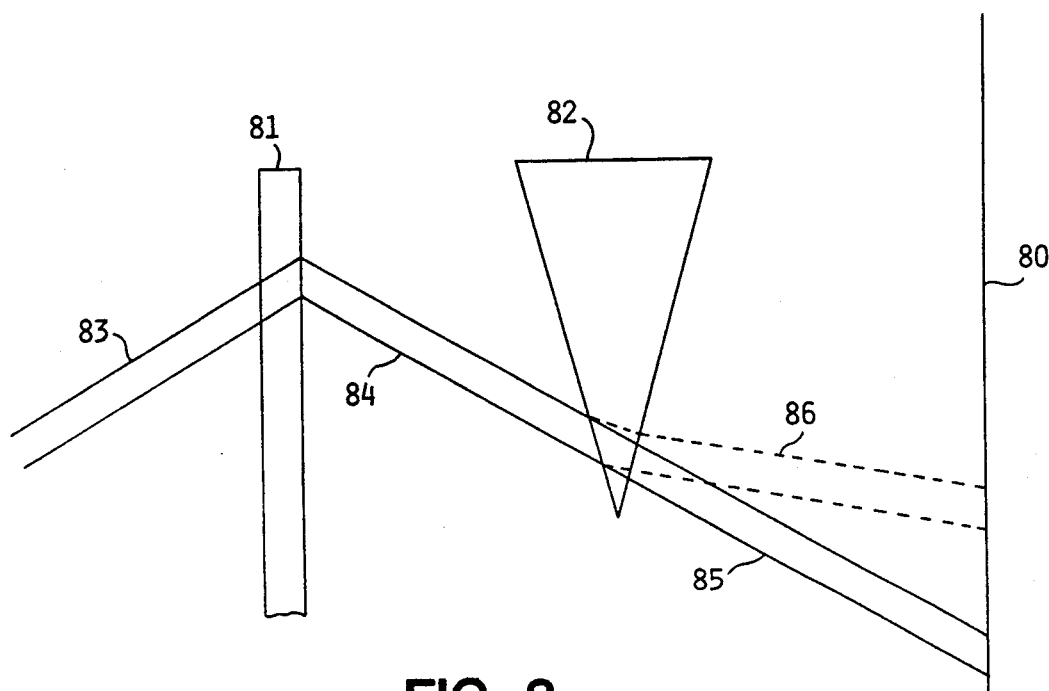
FIG. 8 is a schematic view of an embodiment with a refracting prism for increasing the number of deflection angles.

Another method of increasing the number of deflection angles beyond that obtainable by a single deflector or series of deflectors is to insert, as shown in FIG. 8, a refracting prism 82 in the light path 84 (or path 83) causing path 85 to change to 86. Thus N beam locations on object 80 become 2N locations for a deflector with N segments when Prism 82 is inserted for N locations and removed for N locations.

Figure 9:
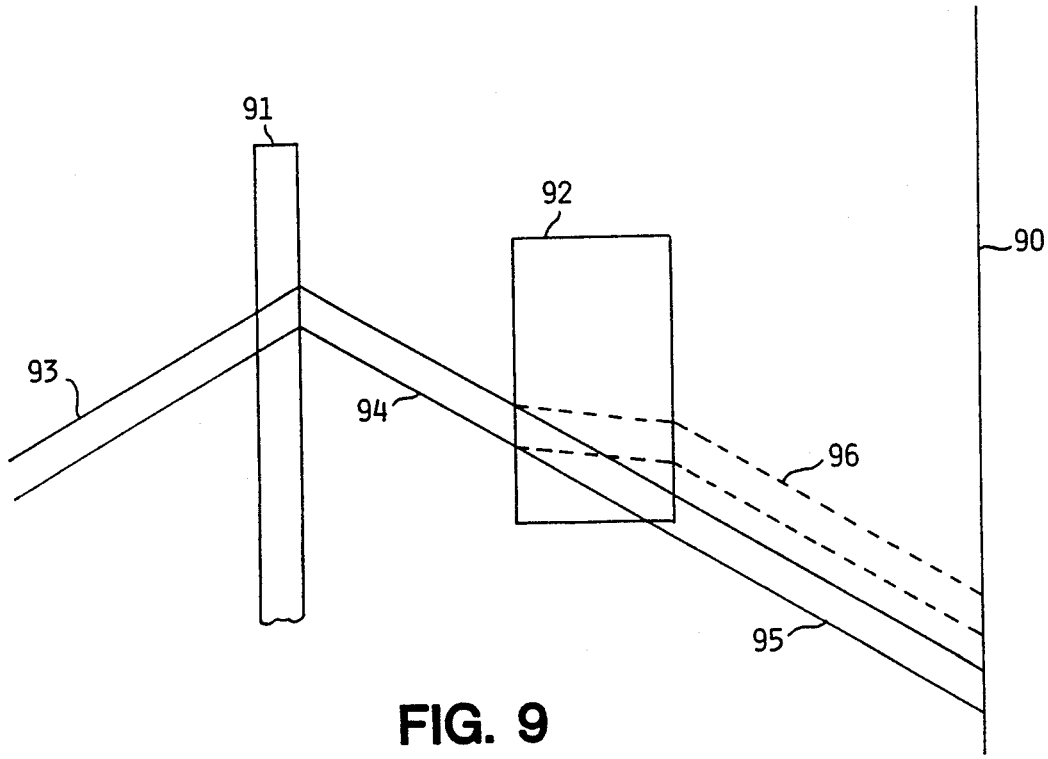
FIG. 9 is a schematic view of a further embodiment using a refractive element with parallel surfaces.

Another way to double the number of beam positions is as shown in FIG. 9 where refracting material 92 with parallel surfaces is inserted into path 94 (or 93) of light beam 93 deflected by deflector 91. No angular change is generated by refractor 92. However, a lateral offset from path 95 when not inserted, to path 96 when inserted, is produced. Thus object 90 can be illuminated with 2N locations with an N segment deflector 91 and insertable refractor 92.

Refractors such as 82 or 92 can be cascaded to further increase the number of beam positions. They also may be oriented at other angles, to deflect orthogonal to the plane of deflection of the primary deflecting mechanism or some arbitrary angle in between.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. An arrangement for use in developing information for three-dimensional measurement and inspection of an object surface comprising:

means for projecting a spot of narrow spectral band of light onto an object surface and having a projection axis along which said spot of light is projected;

means for sensing an image formed by incidence of said spot of projected light on said object surface, said sensing means including: an array of sensing elements, and optical imaging means for conveying said image to said array of sensing elements;

and deflector means in the path of said projection axis for deflecting part of said projection axis between said deflector means and said object to cause said spot to move to a number of positions on said object surface, said deflecting means comprising: movable means having segments of two-dimensional holographic gratings for deflecting said part of said projection axis by a predetermined first angle in one direction and by a predetermined second angle substantially orthogonal to said first angle and proportional to the amount of movement of said movable means, each said segments deflecting said part of said projection axis by a different first angle; and means for moving said movable means.

2. Apparatus as defined in claim 1, including a movable prism insertable selectively in a projection path between said gratings and said object surface to form an additional set of said first angle for increasing the number of deflection angles generated by light beam deflection means.

3. Apparatus as defined in claim 1, including a movable refractor with parallel surfaces insertable selectively in a projection path between said grating and said object surface to form an additional set of said first angle for increasing the number of light beam positions generated by light beam deflection means.

4. A method of making three-dimensional surface measurements, comprising the steps of: stepping a projected beam of light to form a light plane; stepping said light plane to more than one angle within a volume; encoding said light planes by gating fully on or fully off to form a sequence of illuminated and nonilluminated planes; recording sequences of images of said illuminated and nonilluminated planes reflected from a surface to be measured; decoding said recorded images to unambiguously identify each plane image; and relating each plane image to measurement coordinates using calibration information.

5. A method as defined in claim 4, including the step of inserting a movable prism removed from the light beam for a nominal first set of deflection angles and inserted into said light beam to form a second set of deflection angles for doubling the number of deflection angles generated by said movable prism.

6. A method as defined in claim 4, including the step of inserting a movable refractor with parallel surfaces removed from the light beam for a first nominal set of deflected positions and inserted into said light beam to form a second set of deflected positions for doubling the number of light beam positions generated by said movable refractor.

* * * * *